UNITED STATES PATENT OFFICE.

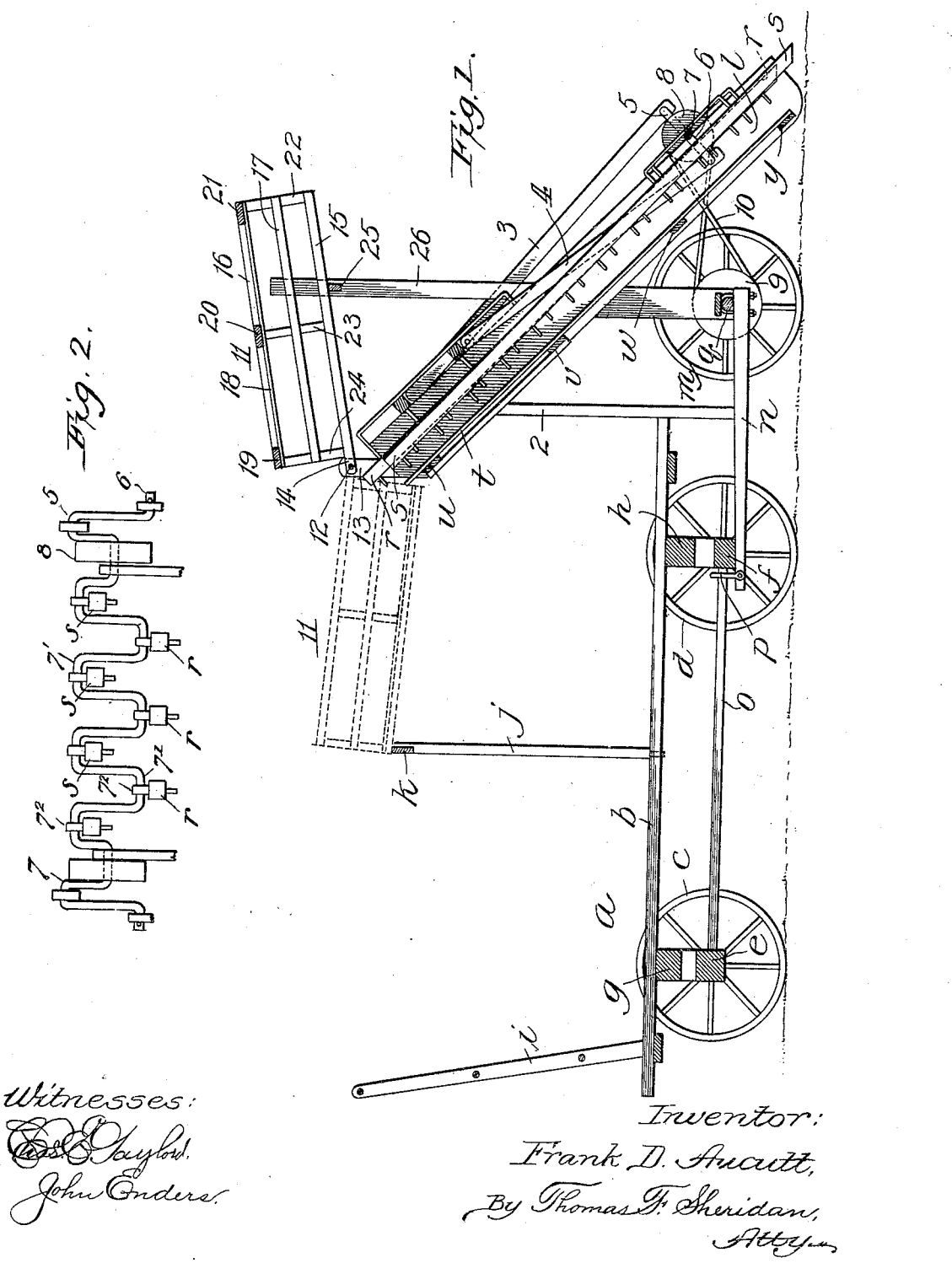

FRANK D. AUCUTT, OF SUGAR GROVE, ILLINOIS.

VEHICLE-LOADER.

No. 819,331.  Specification of Letters Patent.  Patented May 1, 1906.

Application filed September 30, 1905. Serial No. 280,798.

*To all whom it may concern:*

Be it known that I, FRANK D. AUCUTT, a citizen of the United States, residing in Sugar Grove, county of Kane, and State of Illinois, have invented certain new and useful Improvements in Vehicle-Loaders, of which the following is a specification.

This invention relates to that class of vehicle-loaders adapted to be used for the purpose of loading hay, cane, beans, and the like during the movement of the vehicle to be loaded.

The principal object of my invention is to provide a simple, economical, and efficient vehicle-loader.

Other and further objects of the invention will appear from an examination of the drawings and the following description and claims.

The invention, therefore, consists in the features, combinations, and details of construction hereinafter described and claimed.

In the accompanying drawings, Figure 1 is a central longitudinal sectional elevation showing a vehicle provided with a loader constructed in accordance with my improvements. Fig. 2 is a partial transverse section showing the construction of the crank-shaft.

In constructing my improved vehicle-loader I provide a vehicle $a$, having a rack $b$, which may be of any ordinary and well-known form, mounted upon front vehicle-supporting wheels $c$ and rear supporting-wheels $d$ and having a suitable front axle $e$ and rear axle $f$, upon which suitable bolsters $g$ and $h$ are mounted for supporting the rack. The rack is provided with a front upright $i$ for supporting the forward portion of the load in position, and central upright standards $j$ are mounted at the center of the rack and connected, by means of a transverse member $k$, at the upper ends thereof. These central standards or partition members form a partition which separates the front portion of the load from the rear portion and enable such front and rear portions of the load to be unloaded separately and independently of each other.

A carrier-frame $l$, which extends upward and forward at an incline, is mounted upon an axle $q$ and supporting-wheels $m$ back of the vehicle to be loaded and connected with the vehicle to be loaded by means of a tongue $n$, which extends, preferably, under the rear axle of the vehicle, being connected to the vehicle in any ordinary known manner. It may be secured to the reach $o$ by means of a clevis $p$. Two sets of reciprocating toothed carrier-arms $r$ and $s$ are mounted in the carrier-frame over the inclined bottom portion thereof, which is formed of longitudinally-extending slats $t$, mounted on transverse supporting members $u$, $v$, $w$, and $y$. An upright supporting member 2 is connected with the bottom of the carrier-frame, at the forward end thereof, and supported by the tongue of the loader. The toothed carrier-arms are operatively connected with the loader-supporting wheels, so as to be driven thereby, by means of operating-arms 3 and 4, mounted upon cranks 5 and 6, respectively, which may be upon the single crank-shaft 7. The crank-shaft 7 is provided intermediate its ends with a series of crank portions 7', to each of which crank portions one of the toothed carrier-arms $r$ or $s$ is connected, these toothed arms having a sliding engagement with these crank portions by means of sliding hangers $7^2$. By connecting the carrier-arms to the crank-shaft in this manner the racks when in operation are not only reciprocated, but also raised from the table in their rearward movement. The crank-shaft is provided with pulleys 8, which are operatively connected with the supporting-wheels of the loader by means of pulley-wheels 9, mounted in fixed relation to such loader-supporting wheels, and crossed belts 10, which are mounted upon the pulley-wheels 8 and 9.

The above-described portion of the loader is of a type well known in the art and commonly used for purposes of loading hay and the like and forms no part of my present invention, and it will be understood that the carrier-frame and the mechanisms for raising the material to be loaded to the discharge end of the carrier-frame may be of any ordinary known form.

In order to provide suitable means for enabling the hay or other material raised by the carrier-frame to its upper discharge end to be carried forward to the central or forward portion of the vehicle to be loaded and to permit such material when desired to pass directly from the discharge end of the carrier-frame onto the rear portion of the vehicle, a chute 11 is movably mounted at the upper end of the carrier-frame, to which it is movably secured by means of pivots 12, mounted in supporting-standards 13 on the carrier-frame and connecting the projecting end portions 14 of the top members 15 of the pivoted chute with such supporting-standard members. This chute is formed of longitudinally-extending slats 15, 16, and 17, which form the side frames thereof, and longitudinally-extending bottom slats 18, mounted on transverse supporting members 19, 20, and 21 and extending longitudinally of the chute, forming an open-work bottom therefor. Upright side frame members 22, 23, and 24 connect the longitudinal members of the side frames and all form a pivotally-mounted chute of the desired lightness and strength and adapted to be moved by the operator into extended operative position, as shown in dotted lines in the drawings, and into inoperative position, as shown in full lines. When in raised or inoperative position, the chute rests upon a transverse supporting member 25, which extends transversely over the carrier and is mounted at its opposite ends upon uprights 26, secured to the carrier-frame on opposite sides thereof.

By the above arrangement it will be seen that the standard or partition member $j$ is adapted to support the weight of the forward end of the pivoted chute when in extended operative position and permit such forward end of the chute to move transversely of the vehicle as required when the vehicle is turning or traveling in a more or less irregular course. When the chute is in extended operative position, as shown in dotted lines, the hay or other material passes from the upper discharge end of the carrier-frame into the chute and is forced therethrough by the carrier-arms or lifting mechanism to the forward or central portion of the vehicle, into which it is discharged from the front end of the chute. When the chute is in raised or inoperative position, the material is permitted to pass directly from the discharge end of the carrier onto the rear portion of the vehicle.

In operation the rear portion of the vehicle is loaded first, if desired, until the load reaches a point substantially level with the upper end of the carrier-frame. The pivoted chute may then be lowered to extended operative position over the vehicle. The hay or other material is then discharged through the chute until the forward portion of the vehicle is loaded to the desired extent. The chute may then be thrown back to the position shown in full lines over the carrier-frame of the loader, and the rear portion of the load may then be completed. The front and rear portions of the load are effectually separated by the upright standards $j$, which also serve to support the forward end of the chute when in operative position, and they may thus be unloaded separately and independently. It will be readily appreciated that this greatly facilitates the unloading of material such as hay.

I claim—

1. In a machine of the class described, the combination of a carrier-frame, a chute mounted at the upper end of such carrier-frame movable into and out of operative position over the vehicle to be loaded, and upright standards mounted upon the vehicle to be loaded forming a partition between the forward and rear portions thereof and forming a support for the forward end of such chute when in extended operative position.

2. In a machine of the class described, the combination of a carrier-frame, a chute pivotally mounted at the upper end of such frame movable to extended operative position over the vehicle to be loaded and to inoperative position, means for supporting such chute in inoperative positions, and means for supporting the forward end of the chute in operative position which means consist of a partition between the front and rear portions of the vehicle to be loaded, whereby material discharged from the carrier-frame is carried forward over the vehicle when the movable chute is in operative position and permitted to pass onto the rear portion of the vehicle when the movable chute is in inoperative position.

FRANK D. AUCUTT.

Witnesses:
 FRANK SNOW,
 WILLIAM W. MYERS.